United States Patent [19]

Juergens

[11] Patent Number: 5,047,300
[45] Date of Patent: Sep. 10, 1991

[54] ULTRA-THIN PLATE ELECTROCHEMICAL CELL
[75] Inventor: Tristan E. Juergens, Loveland, Colo.
[73] Assignee: Bolder Battery, Inc., Black Hawk, Colo.
[21] Appl. No.: 366,867
[22] Filed: Jun. 14, 1989
[51] Int. Cl.5 .................. H01M 2/22; H01M 4/64
[52] U.S. Cl. ................. 429/94; 429/161; 429/233
[58] Field of Search ............ 429/94, 211, 161, 233
[56] References Cited

U.S. PATENT DOCUMENTS

| | | | |
|---|---|---|---|
| 3,395,043 | 7/1968 | Shoeld | 136/13 |
| 3,494,800 | 2/1970 | Shoeld | 136/176 |
| 3,650,842 | 3/1972 | Bougaran | 429/161 X |
| 3,862,861 | 1/1975 | McClelland et al. | 136/26 |
| 4,137,377 | 1/1979 | McClelland | 429/145 |
| 4,216,280 | 8/1980 | Kono et al. | 429/247 |
| 4,233,379 | 11/1980 | Gross et al. | 429/247 |
| 4,322,284 | 3/1982 | Sugalski | 429/94 |
| 4,332,867 | 6/1982 | Tsuda et al. | 429/161 X |
| 4,414,295 | 11/1983 | Uba | 429/59 |
| 4,460,666 | 7/1984 | Dinkler et al. | |
| 4,465,748 | 8/1984 | Harris | 429/247 |
| 4,637,966 | 1/1987 | Uba et al. | 429/57 |
| 4,648,177 | 3/1987 | Uba et al. | 429/623.2 |
| 4,725,516 | 2/1988 | Okada et al. | 429/225 |
| 4,769,299 | 9/1988 | Nelson | 429/57 |

Primary Examiner—Stephen J. Kalafut
Attorney, Agent, or Firm—Beaton & Swanson

[57] ABSTRACT

An improved rechargeable electrochemical cell having superior recharge and discharge capabilities characterized by the use of ultra-thin non-perforated negative and positive films of lead or nickel to be used in lead acid and nickel cadmium systems. Such electrochemical cells being further characterized by improved terminal connectors that provide a low-resistance low-heat producing connection for rapid discharge applications.

4 Claims, 3 Drawing Sheets

ULTRA-THIN PLATE ELECTROCHEMICAL CELL

FIELD OF THE INVENTION

This invention relates to the method for manufacture of electrochemical cells having superior recharge and discharge capabilities. Such electrochemical cells are comprised of ultra-thin spirally wound plates contained within a hermetically sealed container.

BACKGROUND OF THE INVENTION

There have been dramatic improvements in the design and performance characteristics of compact hermetically sealed rechargeable electrochemical cells. These cells are typically configured either as a series of plates or in a spirally wound electrode assembly. The two commonly used chemical systems are the lead acid system and the nickel cadmium system.

Although the lead acid battery system has been known and utilized for many decades, solutions to many of the practical difficulties associated with using such cells were not proposed until the mid-1970s. One of the difficulties seen with early lead acid cells was related to the problem of keeping the electrolyte acid contained within the cell. It was necessary to maintain an excess amount of acid (generally sulfuric acid) in the cell in order to allow for overcharging of the electrodes during the recharge process. Overcharging leads to the production of hydrogen and oxygen within the cell which traditionally was vented from the cell. Electrochemical cells having vent means and free acid generally had to be held upright in order to prevent the acid from leaking from the cell.

An additional problem with traditional lead acid cells was in maintaining the physical characteristics of the lead plates within the cell. Pure lead has some fluid flow and is also relatively flexible. In order to put some "back bone" in the lead plates, lead containing up to one percent of calcium was often used in cells. The calcium in the lead gives the plates some rigidity, but significantly reduces the efficiency of the discharge/recharge chemistry.

The breakthrough invention in lead acid cells is described in U.S. Pat. No. 3,862,861 of McClelland et al. The McClelland patent discloses the incorporation of several elements that combine to alleviate each of these problems associated with the traditional lead acid cell. The McClelland invention recognized the potential of utilizing the electrochemical recombination reaction between the oxygen and hydrogen formed during overcharging to maintain a balanced system. By capitalizing on the "oxygen cycle", a lead acid cell could be produced such that the electrolyte could be maintained in a "starved" condition. Rather than having an excess of electrolyte, the cell could be operated with a minimal amount of electrolyte present in the system. In order to maintain a starved condition, it is necessary to have sufficient absorbant material or pores within the cell to contain the electrolyte.

By using relatively absorptive separator material, McClelland was able to accomplish two distinct functions. The absorptive separator allowed the flow of gases and electrolyte between the positive and negative plates, thereby allowing the oxygen cycle to function. The absorptive separator also acts as a wick to hold the electrolyte within the cell without the necessity of having free electrolyte in the system.

McClelland also discloses a configuration of the plates and separator so that the elements are held tightly together. Fluid flow of the lead is thus prohibited. It was then possible to use considerably purer lead grids that are electrochemically more efficient than the calcium containing lead plates previously used. Venting means are included in the McClelland device as a safety release device in case, through some malfunction, gases generated during recharging were not reconverted to water. However, since there is little or no non-absorbed electrolyte in the cell, there is almost no danger of acid leaking from the cell.

Prior to the development of the McClelland device, U.S. Pat. Nos. 3,395,043 and 3,494,800 of Shoeld disclosed the use of relatively thin lead plates in an electrochemical cell. The cells described in the Shoeld patents, being prior in time to the McClelland patent, did not use absorptive, gas permeable separators. The cells disclosed did not, therefore, utilize the oxygen cycle, were not maintained in a starved or semi-starved condition, and probably contained free electrolyte in order to function properly. The Shoeld patents do not indicate that the batteries produced would have superior discharge or recharge characteristics. Based on the techniques and materials available at the time of the Shoeld disclosures, it is quite unlikely that the cell disclosed therein would have had any significant advantages over existing cells.

Since the McClelland patent, there have been several patents disclosing improvements to the fundamental cell disclosed therein. For example, U.S. Pat. Nos. 4,465,748 of Harris, 4,414,295 of Uba, 4,233,379 of Gross, 4,137,377 of McClelland and 4,216,280 of Kono each describe separators to be used in starved lead acid cells. U.S. Pat. Nos. 4,725,516 of Okada and 4,648,177 of Uba both identify cell parameters that lead to superior recharge/discharge characteristics in lead acid cells.

U.S. Pat. No. 4,769,299 of Nelson to a certain extent incorporates the inventions of Shoeld and McClelland. The Nelson patent describes the use of grid-like plates and absorptive gas permeable separators as described in McClelland with the extremely thin plates disclosed by Shoeld. The result is a lead acid cell with enhanced recharge/discharge properties.

The theoretical advantage of utilizing thin plates in electrochemical cells has been known for decades. The thinner the plates the less distance electrons have to travel within the plate during discharge, and, during recharge, the shorter distance of non-conductive material to be regenerated. To a certain extent, the thickness of plates utilized has been dictated by the available technology for the production and handling of thin lead films.

For much the same reasons that thin plates produce superior results, thin layers of reactive paste also lead to superior discharge/recharge characteristics. The Nelson patent discloses the use of both thin lead grids and thin layers of reactive paste. A basic shortcoming in the Nelson device, is that the paste residing within the grid openings can have a greatly increased distance to the lead plate material. For example, in the Nelson patent the openings in the lead plate grid are constructed so that the distance from the center of the grid to the grid strands is significantly greater than the thickness of the paste layer on the face of the plate. Since the performance characteristics of electrochemical cells is proportional to the thickness of the lead plates and the thickness of the paste layer, the use of grids greatly decreases the efficiency of the cells.

Typically, spirally rolled electrochemical cells are designed so that tabs are periodically incorporated into the plates—the tabs of one polarity going one way, the tabs of the opposite polarity going the other—in order to make connections from the plates to the cell terminals. This arrangement creates a problem in high rate discharge cells. The rapid discharge of substantial amounts of power generates a significant amount of heat along the tabs and terminals due to the relatively high resistance of the arrangement. U.S. Pat. No. 4,322,484 of Sugalski describes the use of an additional element within the cell to act as a heat sink.

Although there have been significant advances in the field of electrochemical cells, the theoretical possibilities for such systems have not been met.

SUMMARY OF THE INVENTION

The electrochemical cell of the present invention is characterized by the use of ultra-thin non-perforated electrode plates along with ultra-thin active material layers and thin absorptive separator material layers. In the optimum device, the cell is initially produced with an excess volume of electrolyte, but through processing, a volume of electrolyte is achieved in the cell, and the electrolyte volume is maintained in an almost saturated condition with respect to the absorptive capacity of the separator and the electrode materials.

In the present invention electrochemical cells are produced utilizing non-perforated sheets of lead or nickel approximately 0.002 inches thick. The active material or paste maintained on the surface of both sides of the sheet are approximately 0.002 to 0.003 inches thick. The inter plate spacing is 0.005 to 0.007 inches. The cell of the present invention is further characterized by an exceptionally high plate surface area to active material ratio.

When using lead acid cells, the active material may be sulfated lead pastes or PbO and $Pb_3O_4$ for the positive and PbO for the negative plates. When utilizing sulfated pastes, the specific gravity of the electrolyte is about 1.28. The lead plates are greater than 99% pure. If containing tin, the lead may be 99.50% pure lead and 50% tin. If tin is not used, the lead is approximately 99.99% pure.

Any number of separator materials known in the art may be utilized with the present invention. One suitable glass microfiber material consists of 90% of fibers of 1 to 4 microns in diameter and 10% of fibers being larger fibers existing as a woven or oriented mat. Examples of acceptable separator materials are described in U.S. Pat. Nos. 4,233,379 of Gross et al. and 4,465,748 of Harris.

In one embodiment of the electrochemical cells of the present invention, the surface of the electrode plates is either physically roughened or chemically etched to increase the adhesion of the thin layer of active material to the plate surface.

The electrochemical cell of the present invention is further characterized by an improved terminal electrode attachment assembly. According to the invention, one continuous edge of the electrode plate is in contact with the cell terminal, resulting in an efficient low resistance conductive pathway that reduces the build-up of excess heat in a rapid discharge cell.

The electrochemical cell of the present invention demonstrates dramatic improvements in recharge/discharge capabilities over cells produced as described in the various references cited above. Maximum current capability is increased and the current value remains at near its maximum throughout a longer period of its discharge profile. Recharge times are also reduced dramatically. Recharge can be accomplished at up to 10C (or ten times the amperage of the cell), as long as the cell is not overcharged.

DESCRIPTION OF THE PREFERRED EMBODIMENTS

According to the present invention, an electrochemical cell having both excellent charge and discharge characteristics is described. Technological breakthroughs in the fields of thin film handling have made it possible to create high rate electrochemical cells that have performance characteristics that are unprecedented in the field.

Utilizing ultra-thin non perforated films of either lead (for lead acid systems) or nickel (for cadmium nickel systems) in combination with extremely thin layers of active material, it is possible to create cells that have very high utilization of the active material, even at extreme discharge rates. Therefore, even under extreme loads there is virtually no voltage drop within the plates of the cell.

An additional benefit provided when utilizing such ultra-thin plates, is that the increased amount of film cross-sectional area provides a large heat sink for heat generated during discharge. In many rapid rate discharge cells, heat build-up can be substantial. The present invention describes electrochemical cells with quite low current densities, thereby reducing heat creation.

The electrochemical cell of the present invention is composed of ultra-thin non-perforated films of an electrochemically active metal—generally lead or nickel —that is coated on each side with an electrochemically active paste. The positive and negative "plates" of the electrochemical cell are maintained apart from each other by separator material. The separator material also acts to absorb the electrolyte that is contained with the enclosed cell system.

Figure 1:
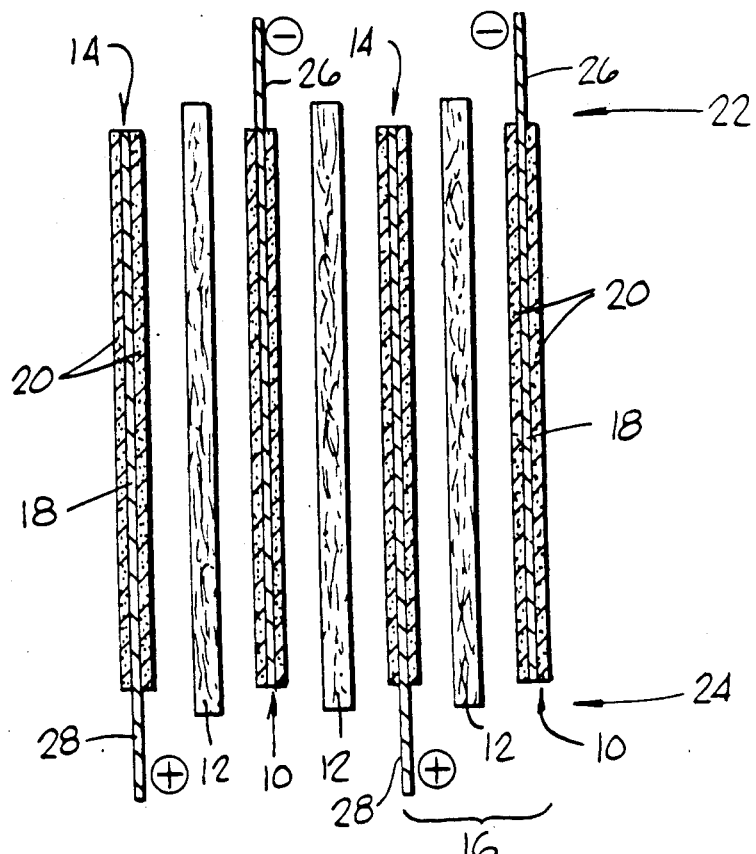
FIG. 1 is a diagrammatic vertical cross-sectional view of a pair of cell units according to one embodiment of the present invention.

A diagrammatic view of a cell unit according to the present invention is seen in FIG. 1. Positive plate 10, separator 12 and negative plate 14 constitute an electrochemical unit cell 16. Both the positive plate 10 and the negative plate 14 consist of an ultra-thin film 18 of either lead or nickel partially coated on both major faces with a layer of a suitable electrochemically active paste 20.

It is important that the film not only be extremely thin, but that it not be perforated. One of the more critical elements of the present invention is that there not be any active material paste 20 at a distance of greater than 0.005 inches from the film 18 on which it is coated.

According to the present invention, the films 18 utilized in the electrochemical cell are no greater than 0.005 inches thick. In the preferred embodiments, the films 18 are about 0.003 to 0.0015 inches thick. Handling such thin films and incorporating the same into functional electrochemical cells was previously thought to be impossible. In certain ways, the electrochemical cells of the present invention are constructed along the lines of standard electrolytic capacitors.

Utilizing such thin films of active material, it is possible to greatly increase an important variable in such electrochemical cells, the ratio of surface area of film to the amount of active paste material. In the present invention, cells having greater than 260 square centimeters of surface area to gram of actual material are described.

A thin layer of the active material paste 20 is applied to a large portion of both major faces of the negative and positive films 18. Each layer is, at the most, 0.005 inches thick, and in the preferred embodiments of the invention, the layers of active material paste 20 are about 0.002 to 0.003 inches thick. Both positive and negative plates 10, 14 are, at the most, 0.010 inches thick and in the preferred embodiment have a thickness of about 0.005 to 0.008 inches, with an interplate spacing of about 0.005 to 0.007 inches.

In each unit cell 16, the positive plate 10, the separator 12 and the negative plate 14 are held against each in a specific physical relation as seen in FIG. 1. Both major faces of the metal films 18 are coated with active material paste 20, except along alternating horizontal edges 22, 24. On the positive plate 10, the portions of the major faces 26 adjacent to the upper horizontal edge 22 are not coated with the active material paste 20, and on negative plate 14, the portions of the major faces 28 adjacent to the lower horizontal edge 24 are not coated with the active material paste 20.

The physical arrangement of plate 10, 14 and separator 12 is also shown in FIG. 1. For example, the positive plate 10 is positioned so that the uncoated portion and the 6 extends above both the negative plate. separator 12. To the top, the separator 12 extends beyond the negative plate 14 but not as far as the positive plate 0 and to the bottom, the separator 12 extends beyond the positive plate 10 but not as far as the negative plate 14. It could, of course, be constructed so that the relative position of the positive and negative plates be reversed.

In an embodiment of the invention wherein a "D" size cell is produced, the negative and positive film 18 is about 1.5 inches high. The uncoated ends extend about 6-8 mm beyond the coated plate, and the separator 12 extends about 2-4 mm beyond the coated plate.

The surfaces of the film 18 that are to be coated are preferably etched or roughened prior to application of the active paste 20. This allows for a more adequate adhesion between the paste and the film.

Figure 2:
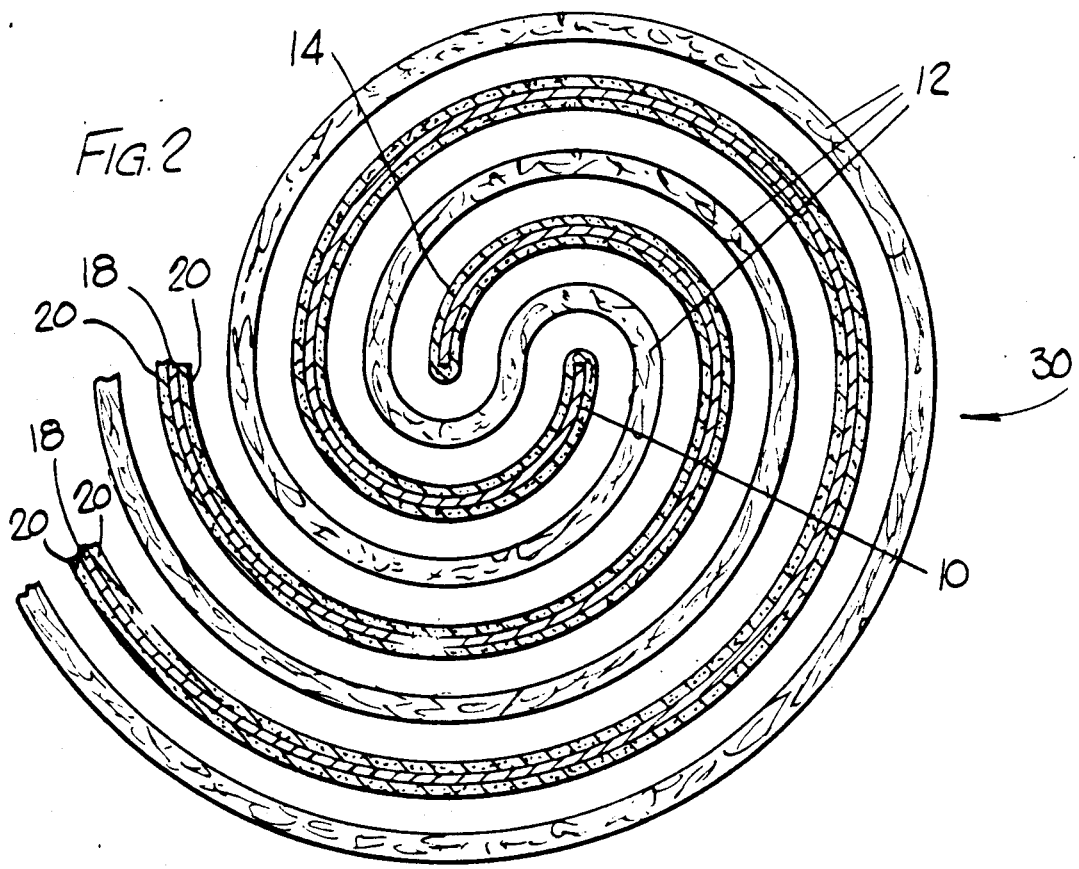
FIG. 2 is a diagrammatic horizontal cross-sectional view of a spirally wound cell unit according to one embodiment of the present invention.

In the preferred embodiment of the invention, the electrochemical cell is constructed of a single spirally wound unit cell as is shown in FIG. 2. Of course, the invention could also be employed utilizing parallel stacks of any number of unit cells. In the spirally wound configuration 30, a single continuous sheet of separator 12 may be employed to separate the negative 14 and positive 10 plates from each other as seen in FIG. 2.

Figure 3:
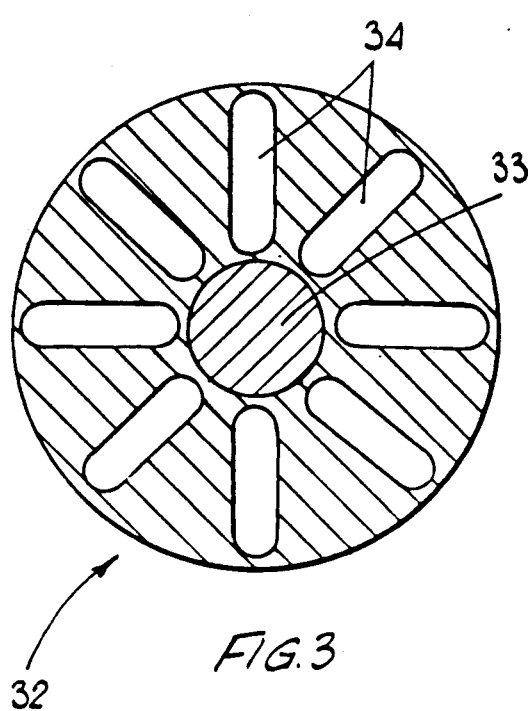
FIG. 3 is a plan view of an embodiment of a terminal connector according to the present invention.
Figure 4:
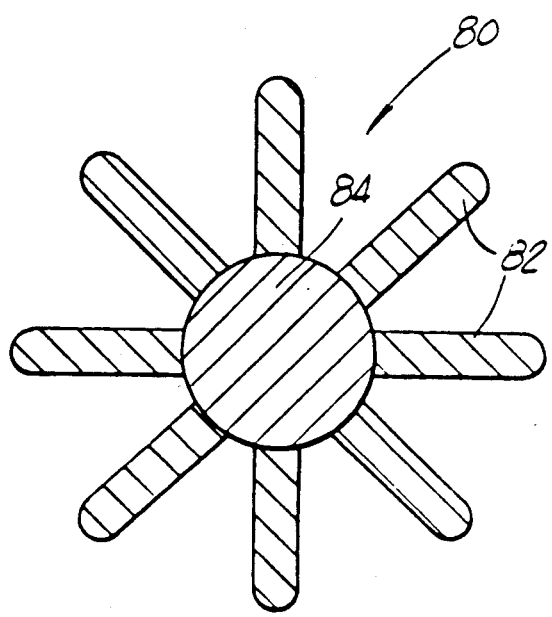
FIG. 4 is a plan view an alternative embodiment of a terminal connector according to the present invention.
Figure 5:
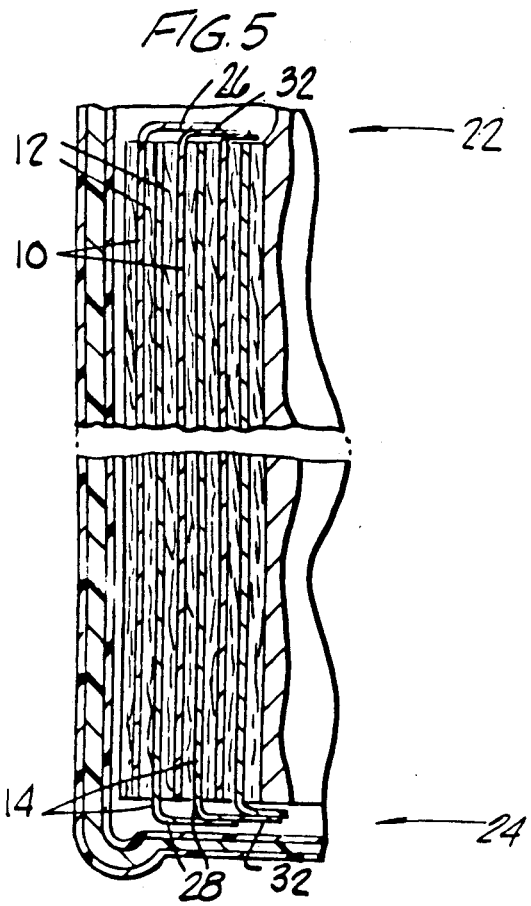
FIG. 5 is a diagrammatic vertical cross-sectional view of a portion of a spirally wound cell unit according to one embodiment of the present invention.

The preferred terminal connector 32 of the present invention is seen in FIG. 3. The terminal connector 32 is a component of the completed electrochemical cell formed near both the top (as seen in FIGS. 1 and 5, the positive terminal) and the bottom (as seen in FIGS. 1 and 5, the negative terminal) of the spirally wound plate and separator unit. The preferred terminal connector 32 is a conically shaped conductive element that is about the same diameter as the spirally wound cell, and that has a plurality of oblong shaped apertures 34 radiating outwardly from the center portion of the circle. The connector 32 may have a connector post 33 for ease in connection. An alternative connector 80 is seen in FIG. 4. This daisy-shaped connector has a plurality of radiating wings 82 protruding out from the body 84 of the connector 80.

A unit cell having the physical relationships as shown in FIGS. 1 and 2 and having terminal connectors 32 in place, is seen in FIG. 5. In the preferred embodiment, the connectors 32 are applied to the top and bottom of the cell (where the uncoated portions 26 and 28 of the negative and positive plates are extending out coplanarly) in a spiral configuration. The effect of such a motion requires that the uncoated portions 26 and 28 are bent radially inwardly. Due to the respective positions of the positive and negative plates 10, 14 and the separator 12, the uncoated portions 26, 28 contact each other and are separated from the opposite polarity plate by the separator 12. It can be seen, therefore, that the relative physical positions of the plates and separator is critical in obtaining a proper connection between the terminal connector 32 and the uncoated portions 26, 28 of the plates.

The terminal arrangement of the present invention provides an improved means for maximizing contact between the respective plates 10, 14 and the terminal connector 32. The larger the surface area of each plate contacting the connector 32, the less resistance created in the system, and the less heat generated. In a preferred embodiment, the connectors 32 are permanently attached to the ends of the electrochemical cell by laser welding or plasma arc welding. The oblong apertures 34 are spaced to allow access to the interior surface of the connector 32 for welding.

Figure 6:
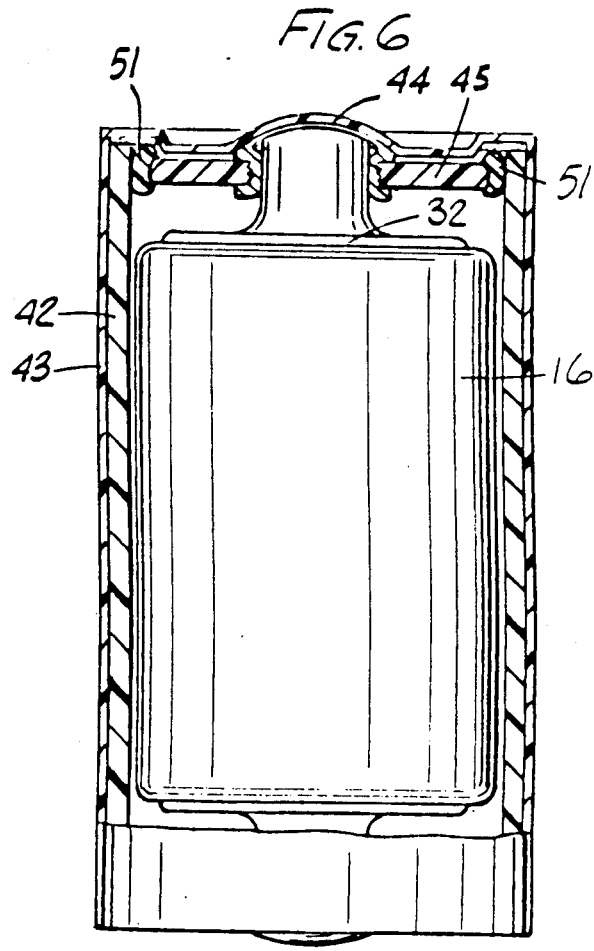
FIG. 6 is a partial cross-sectional view of the terminal portion of an embodiment of the cell unit of the present invention.

An embodiment of the completed electrochemical cell terminal assembly 40 is seen in FIG. 6. The spirally wound unit cell 16 is held first in a polypropylene sealed container 42 and second in a stainless steel container 43 that is preferably equipped with vent means (not shown). The terminal connectors 32 are held in place by a torroidal brace 45, that holds such connectors 32 in contact with the exterior terminal 44. Insulation washer 51 insulates the external terminal 44 from the stainless steel container 43.

When utilizing the lead acid system, the lead non-perforated film 18 is preferably composed of lead that is at least 99.99% pure. In an alternative embodiment, the lead may be 99.50% pure and contain about 0.50% tin. As described above, the lead film for each embodiment 18 is about 0.005 inches or less thick, and is preferably about 0.003 to 0015 inches thick.

For lead acid electrochemical cells, there are a number of widely known combinations of active material pastes 20 that are typically used. Any of these commonly utilized systems would be appropriate for use with this invention. For example, sulfated PbO pastes used on both the positive and negative plates provides a satisfactory system, as does the use of PbO and $Pb_3O_4$ on the positive plate and PbO on the negative plate. The use of sponge lead, litharge, red lead or leady oxide is also possible. The only important factor is that the active material paste 20 be of a nature so that it can be applied to the ultra-thin lead film 18 in a consistently thin layer, as described above.

As is commonly seen in the new generation of the lead acid cells as exemplified in the McClelland and Nelson patents, the use of an absorbent, permeable separator 12, which permits gas transfer, is critical. As described above, there are several separator materials that have been disclosed for use specifically with lead acid system electrochemical cells. For the purposes of the present invention, any of the commonly used absorbent separators will work suitably. In one preferred embodiment, the separator is a glass micro-fiber wherein 90% of the fibers are 1-4 microns in diameter, and 10% of the fibers are longer (up to 1 inch in length), being about 95% porous in the uncompressed state.

When sulfated lead oxides are used as the active material paste 20, the specific gravity of the sulfuric acid electrolyte solution used is between 1.20 and 1.32. Electrolyte concentration in the cell is established by adding an excess of electrolyte, and heating the cell in order to vent excess electrolyte. The type of vent used on the electrochemical cell may be similar to those described in the literature and known by those with ordinary skill in the art, and operates to vent excess gases when the internal pressure exceeds a certain level. The electrolyte remaining in the cell after heating and venting will be in an almost saturated state and some internal pressure (above atmospheric) will be maintained when in its normal operational state. In its operable state, the cell of the present invention is maintained so that the total void volume of the compressed separator and the active material is substantially filled, yet there is no free electrolyte present. The exact amount of electrolyte present in the cell, within these limits, is not critical to the functioning of the present invention.

EXAMPLE

Figure 7:
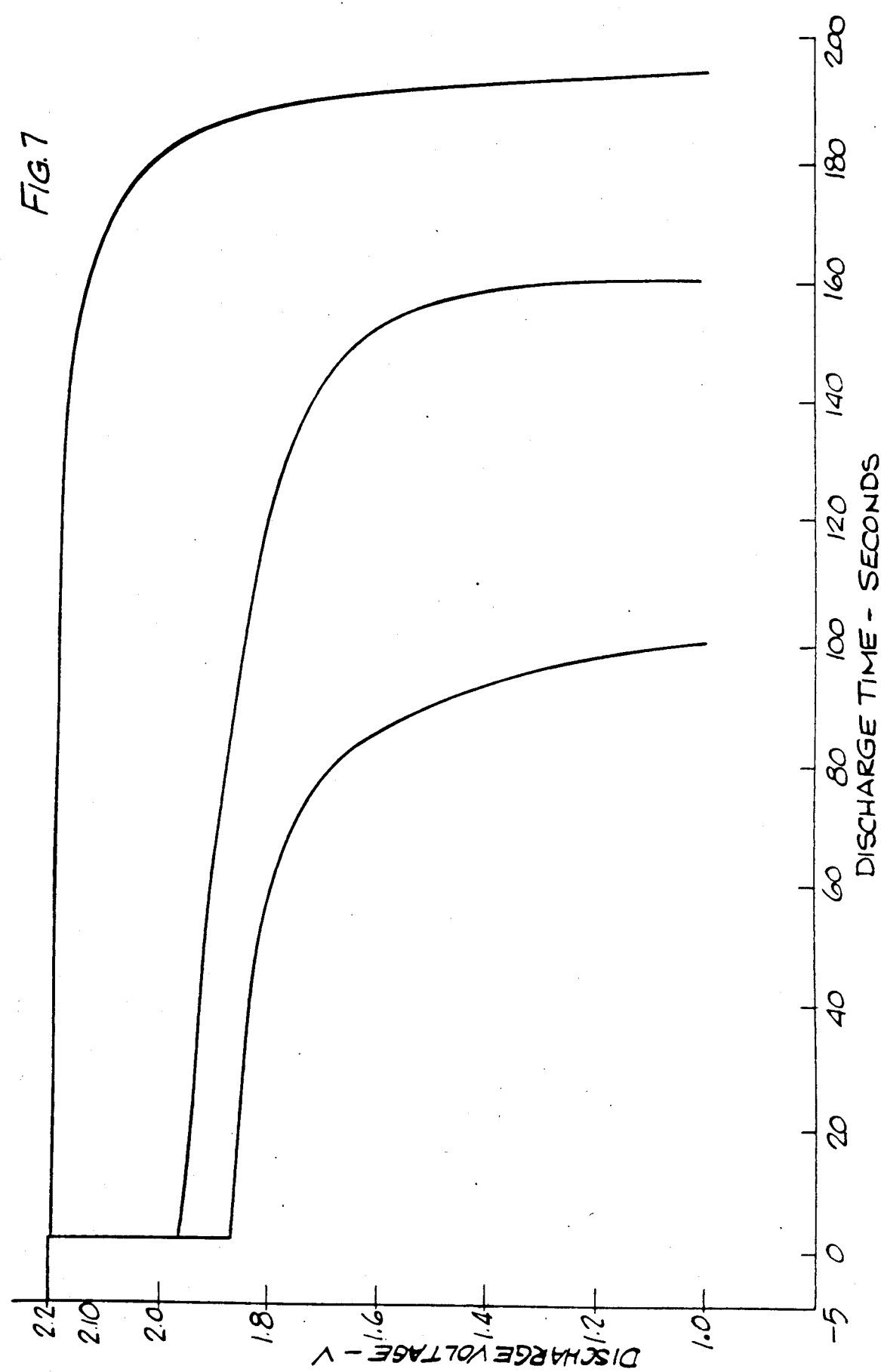
FIG. 7 depicts discharge curves comparing cells of this invention with conventional cells.

As mentioned previously, electrochemical cells produced according to the present invention have distinctly superior discharge and recharge capabilities. FIG. 7 shows the discharge curve for a lead acid electrochemical cell according to the embodiment of the present invention (C) in comparison with discharge curves for the cells described in U.S. Pat. Nos. 3,862,861 of McClelland et al. (A) and 4,769,299 of Nelson (B). As can be seen, the improved performance is more than just an incremental increase.

The electrochemical cell used to create the discharge curve seen in FIG. 7 has the following characteristics: The non-perforated lead film was composed of 99.50% lead and 0.50% tin; the lead films were 0.002 inches thick and were coated with a layer of 0.002 inches thick of sulfated pastes —the total plate thickness being 0.006 inches; the electrolyte was sulfuric acid with a specific gravity of 1.28; the glass micro-fiber separator was 95% porous in its uncompressed state and contained 90% 1-4 micron diameter fibers and 10% larger fibers up to 1 inch in length and has a surface area of about $2m^2/g$. In a "D" sized electrochemical cell, the lead films would be 45 inches long and 1.5 inches high, and there would be about 260 $cm^2$ of surface area for each gram of active material paste.

The cells of the present invention can be recharged at extremely high rates relative to cells currently available. As long as significant overcharging is now allowed, the cells can be recharged at up to 10C, or ten times the rate amperage of the cell.

The present invention has the applications in all electrochemical cells, and in particular, the lead acid and nickel cadmium systems. The descriptions given and the example presented are for the purposes of illustration and are not meant to limit the claims of the application as set forth below.

I claim:

1. A rechargeable electrochemical cell comprising:
   porous positive and negative plates, each having major faces and formed of an ultra-thin non-perforate film of metal partially coated with a layer of electrochemically active paste;
   porous, compressible separator interposed between said positive and negative plates and compressed against the major faces of such plates to define, in combination, a cell unit having first and second horizontal edges;
   a container encapsulating said cell units;
   liquid electrolyte within said container; and
   said plates have a thickness of less than 0.01 inches and said films have a thickness of less than 0.005 inches.

2. The electrochemical cell of claim 1 wherein said plates have a thickness of less than 0.008 inches and said films have a thickness of less than 0.003 inches.

3. A rechargeable electrochemical cell comprising:
   porous positive and negative plates, each having major faces and formed of an ultra-thin non-perforate film of metal partially coated with a layer of electrochemically active paste;
   porous, compressible separator interposed between said positive and negative plates to define, in combination, a cell unit, having first and second horizontal edges;
   a container encapsulating said cell unit;
   liquid electrolyte within said container;
   said cell unit is spirally wound about a central axis and held tightly in a tubular configuration;
   on the first horizontal edge of said cell unit said negative plate extends beyond the edge of said separator, the separator extends beyond the edge of said positive plate and said negative film is not coated with said paste in the portion extending beyond said separator;
   on the second horizontal edge of said cell unit, said positive plate extends beyond the edge of said separator, the separator extends beyond the edge of said negative plate, and said positive film is not coated with said paste in the portion extending beyond said separator;
   negative and positive terminal connectors, said negative connector adjacent to said first horizontal edge of said cell unit said positive connector adjacent to said second horizontal edge of said cell unit;
   said terminal connectors are conductive cones containing a plurality of oblong radial apertures; and
   said connectors are secured to the portion of said plates extending beyond said separator, such portion bending radially inward.

4. A rechargeable electrochemical cell comprising:
   positive and negative plates, each having a major face, formed of a film of metal partially coated with a layer of electrochemically active paste;

porous, compressible separator interposed between said positive and negative plates and compressed against the major faces of such plates to define, in combination, a cell unit having first and second horizontal edges; said cell unit being spirally wound about a central axis and held tightly in a tubular configuration, on the first horizontal edge of said cell unit, said negative plate extends beyond the edge of said separator, the separator extends beyond the edge of said positive plate, and said negative film is not coated with said paste in the portion extending beyond said separator; and on the second horizontal edge of said cell unit, said positive plate extends beyond the edge of said separator, the separator extends beyond the edge of said negative plate, and said positive film is not coated with said paste in the portion extending beyond said separator; and negative and positive terminal connectors, said negative connector adjacent to said first horizontal edge of said cell unit, and said positive connector adjacent to said second horizontal edge of said cell unit; said terminal connectors being conductive cones containing a plurality of oblong radial apertures; said connectors secured to the portion of said plates extending beyond the edge of said separator, such edges bending radially inward.

* * * * *